United States Patent [19]

Holbrook

[11] 4,114,922
[45] Sep. 19, 1978

[54] VEHICLE HITCH DEVICE

[76] Inventor: James E. F. Holbrook, 555 Ward St., Urbana, Ohio 43078

[21] Appl. No.: 793,715

[22] Filed: May 4, 1977

Related U.S. Application Data

[63] Continuation of Ser. No. 641,153, Dec. 15, 1975.

[51] Int. Cl.² .............................................. B60d 11/06
[52] U.S. Cl. ................................................... 280/512
[58] Field of Search ............................... 280/512, 507

[56] References Cited

U.S. PATENT DOCUMENTS

| 2,070,884 | 2/1937 | Claus | 280/512 |
| 2,170,980 | 8/1939 | Thorp | 280/512 |
| 2,475,878 | 7/1949 | Clark | 280/512 |
| 2,902,294 | 9/1959 | Kirkpatrick | 280/512 |

*Primary Examiner*—Robert R. Song
*Attorney, Agent, or Firm*—John B. Armentrout

[57] ABSTRACT

A vehicle hitch device is provided wherein a draft body having a hollow and a notch therein from an open end thereof, is pivotally connected with draft thrust transmission means, for the latter pivotally to reach hitching and release positions. Presser and biasing means, affording rectilinearly movable presser means slidably within the hollow of the draft body, and biasing means, has recessed contact structure of the presser means adjacent to the open end of the draft body, for the head of a stemmed head member to be pressed into the open end of the draft body against bias of the biasing means while the draft thrust transmission means is in a hitch release position and the head of a stemmed head member contacts the presser means in the recess of the contact structure of the presser means, causing the presser means to retract and the stem of a stemmed head member to be in the notch. Contact structure of the draft thrust transmission means is recessed and is adapted to contact the head of a stemmed head member during pivotal movement of the draft thrust transmission means from a hitch release position to hitching position in favor of having the presser means retract, and the recess in the contact structure of the draft thrust transmission means, in the hitching position of the latter, is adapted to receive the head of a stemmed head member which also is within the recess in the contact structure of the presser means and is pressed by the presser means under bias of the biasing means and has a stem in the notch.

9 Claims, 5 Drawing Figures

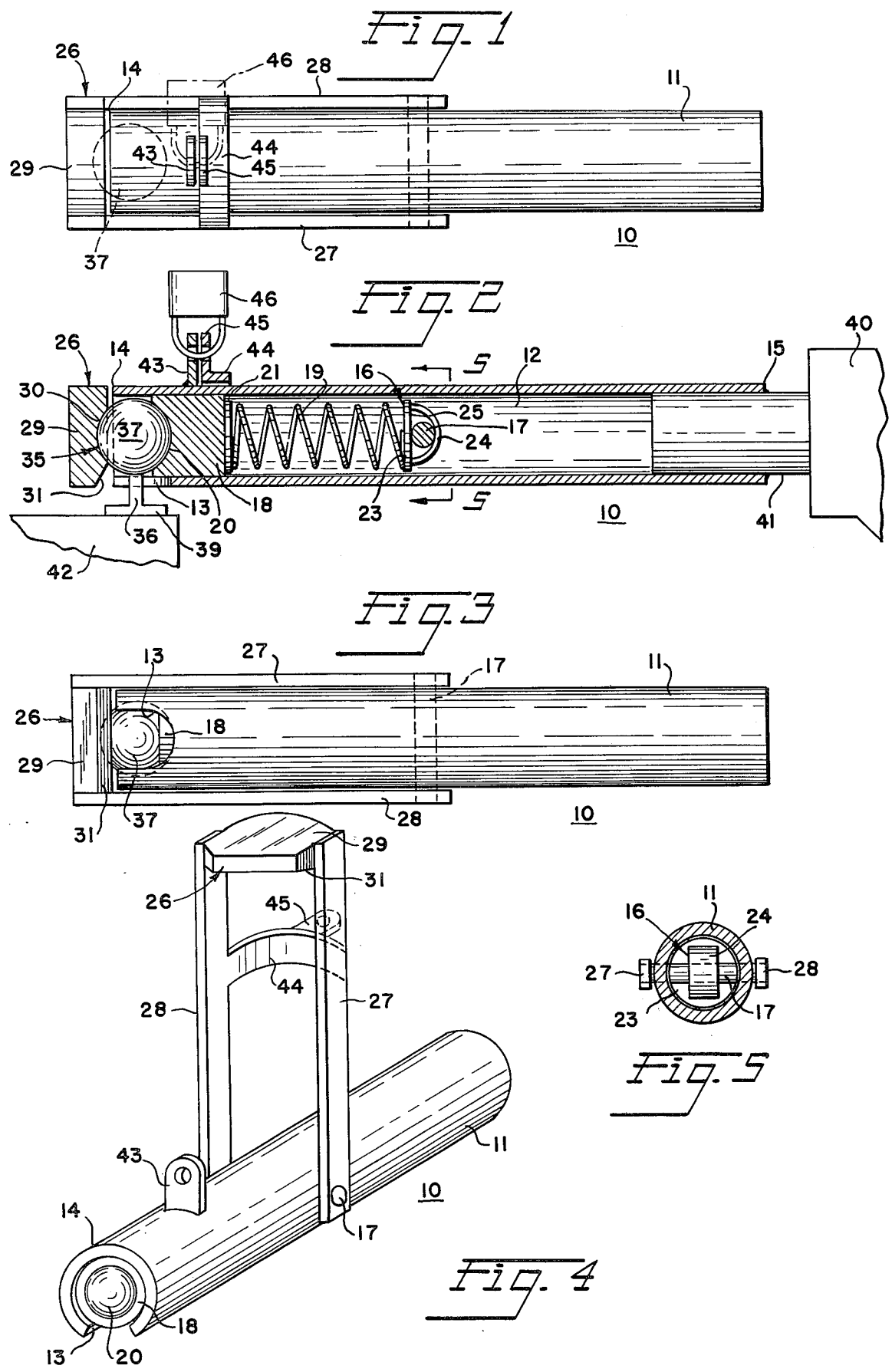

VEHICLE HITCH DEVICE

This is a continuation of application Ser. No. 641,153, filed Dec. 15, 1975.

This invention relates to hitches or couplers for use between leading and trailing vehicles and is more particularly concerned with hitch means which is adapted to be connected with a first vehicle and engage a stemmed head type coupling member on a second vehicle so as to connect one of the vehicles in a towing relation to the other, and the subject matter herein disclosed furthermore is a continuation of the now abandoned James E. F. Holbrook U.S. patent application Ser. No. 641,153, filed Dec. 15, 1975 and entitled, "Vehicle Hitch Device."

An object of the present invention is the provision of simple, practical and reliable hitch means for releasably connecting a first vehicle with a stemmed head member on a second vehicle thus to place the vehicles releasably in a towing and trailing relation.

Another object herein is to provide hitch means whereby a first vehicle is releasably connected with a stemmed head member on a second vehicle so as to have one of the vehicles tow the other, and which hitch means quite satisfactorily interrelates structure thereof with the stemmed head member to receive the latter for forming a connection therewith when desired by a user, and for the connection to be maintained, and the connection to be released under control of the user.

Other objects of the invention in part will be obvious and in part pointed out more fully hereinafter.

In accordance with the present invention, a vehicle hitch device is provided which is characterized by including a hollow draft body adapted to be connected with a first vehicle and accommodate a stemmed head member, such as of conventional stemmed ball type, which is a fixture of a second vehicle, and the hitch device further comprises, draft thrust transmission means pivotally connected with the hollow draft body, and rectilinearly movable presser means within a hollow in the draft body with the presser means being biased, such as by means of a helical spring, to move in a direction outwardly rectilinearly through an open first end of the hollow draft body with having contact structure of the presser means in contact with the head of the stemmed head member on the second vehicle and the head of the stemmed head member entered into the open first end of the draft body while the stem of the stemmed head member is entered into a notch in the draft body at the open first end.

The vehicle hitch device and stemmed head member accordingly are suited for the head of the stemmed head member to enter the open first end of the draft body against thrust exercised by the presser means, as biased, and cause the presser means to retract and thus to have the stem of the stemmed head member enter the notch in the draft body. While the head of the stemmed head member accordingly is pressed against the contact structure of the presser means inside the hollow draft body, and the stem of the stemmed head member is in the notch in the draft body, contact structure of the draft thrust transmission means may be brought by pivotal movement of the draft thrust transmission means from a hitch release position into a coupling or hitching position outside the open first end of the draft body, thus having the head of the stemmed head member pressed by the presser means, as biased, against the contact structure of the draft thrust transmission means, for one of the vehicles to tow the other through the hitch device. In preferred embodiments in accordance with the present invention, the hitch device includes an engagable portion connected with the draft body and an engagable portion connected with the draft thrust transmission means, and the engagable portions are adapted to be releasably engaged for releasably securing the draft thrust transmission means in hitching position.

In the accompanying drawing representing an illustrative and presently preferred embodiment of this invention:

FIG. 1 is a top plan view of a vehicle hitch device with the components thereof interrelated in hitching position;

FIG. 2 is a longitudinal section of the hitch device of FIG. 1 taken in a vertical plane including the longitudinal axis of the device and also representing portions of leading and trailing vehicles;

FIG. 3 is a bottom plan view of the vehicle hitch device of FIG. 1;

FIG. 4 is an isometric view of the hitch device of FIG. 1 and represents the device in open position; and FIG. 5 is a transverse sectional view of a pivotal connection of the hitch device in FIG. 2 appearing in a vertical plane including line 5—5 in the latter figure.

Referring now more particularly to the embodiment represented in the accompanying drawings, a vehicle hitch device, designated generally by the reference numeral 10, is provided and comprises a draft body which includes a draft sleeve 11 wherein there is a hollow 12 extending longitudinally inwardly of the draft sleeve from an open longitudinal first end 14 of the draft sleeve, the sleeve being of steel or of other suitable material and being generally cylindrical both internally and externally from the open longitudinal first end 14 to a second longitudinal end 15 of the sleeve. A presser and biasing unit 16, within the hollow 12, is anchored to a pivotally movable draft pin 17. The longitudinal axis of the draft pin 17 is approximately on the diameter of the draft sleeve 11 and this same pin extends in close fit pivotally through opposed apertures in the wall of the draft sleeve.

In further particular, in accordance with the present embodiment, each of the several components of the presser and biasing unit 16 is made of steel, or of any other suitable material, and the presser and biasing unit in this regard includes a generally cylindrical rectilinearly movable presser member 18 which is slidable against the generally cylindrical inside surface of the draft sleeve 11 and has an outer end wherein there is a recess 20. A first end of spring 19 in the hollow 12 is connected with the inner end of the presser member 18 by having the corresponding end portion of the spring welded to a retaining plate 21 which, in turn, is welded to the inner end of the presser member. The opposite end portion of the presser and biasing unit 16 comprises anchoring means, the latter being constructed having a retaining plate 23 welded to the adjacent inner end portion of spring 19 and further having a loop 24 connected with the retaining plate 23. The pivotally movable draft pin 17 is received through an aperture 25 formed by loop 24 with the plate 23 and accordingly the presser and biasing unit 16 is anchored to the draft pin.

Draft thrust transmission means 26, fashioned for example of steel, has a pair of legs 27 and 28 interconnected by a draft head portion 29 so as to present a generally U-shaped configuration with the draft head portion 29 being in the bight. Legs 27 and 28 are provided with transverse apertures which receive projecting opposite ends of the draft pin 17 on opposite sides of the draft sleeve 11, and the legs are attached as by welding to those ends of the draft pin. The arrangement is such that the radial reaches of the legs 27 and 28 from the draft pin 17 to the draft head portion 29 are substantially equal to one another for the draft head portion 29 to be pivoted with the legs 27 and 28 from hitch release position to a hitching position on a radius which is constant. In the aforementioned hitching position, the draft head portion 29 is in longitudinal axial alignment with the draft sleeve 11 and is adjacent to the longitudinal first end 14 of the draft sleeve. The draft head portion 29 furthermore has clearance with reference to the draft sleeve for being moved arcuately transversely away from the longitudinal first end 14 of the draft sleeve to hitch release position.

A recess 30 is provided in the draft head portion 29 adjacent to a bevel face 31 of the draft head portion so as to have the bevel face lie next to end 14 of the draft sleeve 11 in the hitching position of the draft head portion 29 and for the recess 30 to oppose the recess 20 in the presser member 18 when the draft head portion is in hitching position. There is a notch 13 entrant longitudinally of the draft sleeve 11 from the first end 14 of the draft sleeve and the notch 13 extends through the wall of the draft sleeve from outside the latter and into the hollow 12.

Hollow 12 in the draft sleeve 11 leads through the draft sleeve to the second longitudinal end 15 into which a draw bar 41 of a first vehicle 40 is inserted and is suitably secured to the draft sleeve 11 as by welding. The vehicle hitch device is adapted to cooperate with a stemmed head member 35, the latter including a stem 36, a generally spherical head 37 slightly smaller in diameter than the diameter of the draft sleeve 11 inside the first longitudinal end 14, and a base 39 suitably connected with the frame of a second vehicle 42 and connected with the generally spherical head 37 by means of the stem 36, and in this respect the rectilinearly movable presser member 18, and the draft head portion 29 of the draft thrust transmission means 26 have generally spherical surfaces in the recesses or sockets 20 and 30 which substantially conform to the outside surface of the generally spherical head 37, and the stem 36 is adapted to enter with appreciable clearance the notch 13 with having the generally spherical head 37 introduced within the hollow 12 from the open first end of the draft sleeve 11. During the latter movement, the draft thrust transmission means 26 occupies a normally up, hitch release position (see FIG. 4) wherein the draft head portion 29 is transversely away from the open longitudinal first end 14 of the draft sleeve 11. The generally spherical head 37 of the stemmed head member 35 is urged into recess 20 against the rectilinearly movably presser member 18 and against bias of the spring 19, causing the rectilinearly movable presser member to retract, during which time the stem 36 enters the notch 13 and the spherical head 37 advances into the hollow 12. The bevel face 31 of the draft head portion 29 is adapted to contact the spherical head 31 wedgingly, during pivotal movement of the draft thrust transmission means 26 on the axis of the draft pin 17 from hitch release position to hitching position, in favor of having the presser member 18 retract against bias of the spring 19. The recess 30 in the draft head portion 29, in the hitching position of the draft thrust transmission means 26, receives the spherical head 37, which at that time also is within the recess 20 and is pressed by the presser member 18 under bias of the spring 19 while the stem 36 is in the notch 13. Accordingly, the spring 19 biasingly maintains a draft bearing wherein the spherical head 37 can ride against the spherical surfaces of the presser member 18 and the draft head portion 29 in the recesses 20 and 30 when the draft thrust transmission means 26 is in hitching position and either of the vehicles 40 and 42 is towing the other.

In order to protect against release of the draft thrust transmission means 26 from the hitching position, the hitch device 10 includes an engagable portion in the form of a lug 43 connected with the wall of the draft sleeve 11 and projecting outside that wall intermediately of the legs 27 and 28 of the draft thrust transmission means. Legs 27 and 28 are interconnected by a lateral bridging member 44 having integral therewith a lug 45 which tolerates pivotal movement of the draft thrust transmission means 26 about the axis of the draft pin 17 in the manner hereinbefore described and for the lug 45 to be brought opposite and adjacent to the lug 43 in the hitching position of the draft thrust transmission means.

Lugs 43 and 45 are adapted to be engaged for securing the draft thrust transmission means 26 in the hitching position and in this regard are provided with apertures which receive the arm of a padlock 46 or are otherwise suitably engaged with one another. To release the draft thrust transmission means 26 from hitching position after unlocking the padlock 46 and removing it from the lugs 43 and 45, the spherical head 37 and the stem 36 are caused to retract further into the hollow 12 and the notch 13, respectively, against bias of the spring 19, by suitably applied thrust, thus freeing the spherical head 37 from the recess 30 and enabling the draft thrust transmission means 26 to be pivoted about the axis of the pin 17 to a hitch release position allowing removal of the spherical head 37 and the stem 36 from the hitch 10.

As the invention lends itself to many possible embodiments and as many possible changes may be made in the embodiment hereinbefore set forth, it will be distinctly understood that all matter described herein is to be interpreted as illustrative and not as a limitation.

I claim:

1. A vehicle hitch device comprising, a draft body having a hollow therein and a notch through said draft body into an opening into said hollow to enable the head of a stemmed head member to be inserted into said hollow through said opening and the stem of said stemmed head member to be inserted into said notch, engagable means of said draft body having an aperture therein for said engagable means of said draft body to be engaged; and means for resiliently pressing and releasably engaging said head of said stemmed head member, the latter said means including, presser and biasing means comprising, rectilinearly movable presser means in said hollow and having contact structure wherein there is a recess, and means for biasing said presser means to contact said head of said stemmed head member in said recess in said contact structure of said presser means when said head projects outwardly from said hollow through said opening and said stemmed head member is unhitched and is to be hitchingly engaged; and draft thrust transmission means comprising draft head means having contact structure, first and second leg means interconnected by said draft head means having said draft body disposed intermediately of said first and second leg means, and a pin extending through said draft body and connected with said first and second leg means for connecting said draft thrust transmission means to be moved to have said contact structure of said draft head means encounter said head of said stemmed head member with said head of said stemmed head means projecting outside said opening from said hollow during pivotal movement of said draft thrust transmission means under conditions of said head of said stemmed head member being in contact with said contact structure of said presser means in said recess in said contact structure of said presser means with said presser means being thrust inwardly into said hollow against bias of said biasing means while said stem of said stemmed head member is in said notch, and said draft thrust transmission means having a recess in said contact structure thereof for said head of said stemmed head member, by outward movement of said stemmed head member with said head pressed by said presser means in said recess in said contact structure of said presser means under bias of said biasing means, to be in said recess in said contact structure of said draft thrust transmission means outside said opening from said hollow when said draft thrust transmission means is in hitching position, and for said head of said stemmed head member to be retracted from said recess in said contact structure of said draft thrust transmission means by inward movement of said stemmed head member and said presser means against bias of said biasing means, thus enabling pivotal movement of said draft thrust transmission means away from said opening to an unhitching position relative to said stemmed head member, and said draft thrust transmission means further including engagable means forming an aperture and bridging said first and second leg means for said apertures in said engagable means of said draft body and said engagable means of said draft thrust transmission means to receive fastener means when said draft thrust transmission means is in said hitching position.

2. A vehicle hitch device as set forth in claim 1 wherein said biasing means includes helical spring means in said hollow and said spring means connected with said rectilinearly movable presser means and said pin for anchoring said presser means to said pin and controlling said spring means to bias said presser means to be against said head of said stemmed head member with said head of said stemmed head member projecting outwardly from said hollow through said opening and contact said draft head means in said recess in said contact structure of said draft head means in said hitching position of said draft thrust transmission means.

3. A vehicle hitch device as set forth in claim 2 wherein said draft head means of said draft thrust transmission means has a bevel surface for said bevel surface to contact wedgingly against said head of said stemmed head member as said draft thrust transmission means is being pivotally moved toward said hitching position, and said helical spring means biases said presser means to contact said head of said stemmed head member in said recess in said contact structure of said presser means whether said head of said stemmed head member is projecting outwardly from said hollow through said opening and contacting said bevel surface of said draft head means during pivotal movement of said draft thrust transmission means toward said hitching position or whether said head of said stemmed head member is projecting outwardly from said hollow through said opening and contacting said draft head means in said recess in said contact structure of said draft head means in said hitching position of said draft thrust transmission means.

4. A vehicle hitch device as set forth in claim 1 wherein said draft head means and said contact structure of said presser means have generally spherical surface areas in said recesses substantially to conform to generally spherical surface areas of said head of said stemmed head member while said head of said stemmed head member is pressed by said contact structure of said presser means under bias of said biasing means and is against said draft head means in said hitching position of said draft thrust transmission means.

5. A vehicle hitch device as set forth in claim 3 wherein said draft head means and said contact structure of said presser means have generally spherical surface areas in said recesses substantially to conform to generally spherical surface areas of said head of said stemmed head member while said head of said stemmed head member is pressed by said contact structure of said presser means under bias of said biasing means and is against said draft head means in said hitching position of said draft thrust transmission means, and said bevel surface of said draft head means is adapted to contact wedgingly a generally spherical portion of said head of said stemmed head member while said head projects outside said opening from said hollow and said draft thrust transmission means is pivotally moved toward said hitching position, meanwhile to have said head of said stemmed head member and said presser means thrust inwardly into said hollow against bias of said biasing means with said head of said stemmed head member and said contact structure of said presser means being in generally spherical surface area contact in said recess in said contact structure of said presser means.

6. A vehicle hitch device as set forth in claim 1 wherein said contact structure of said draft thrust transmission means has a bevel surface inclined outwardly from said recess in said contact structure of said draft thrust transmission means to an outer end of said bevel surface leading in said pivotal movement of said draft thrust transmission means toward said hitching position, for actual contact made by said outwardly inclined bevel surface with said head of said stemmed head member to progress inwardly toward said hollow as said actual contact approaches said recess in said contact structure of said draft thrust transmission means during continued pivotal movement of said draft thrust transmission means toward said hitching position and while said head of said stemmed head member is received in said recess in said presser means and progresses into said hollow against bias of said biasing means upon said presser means.

7. A vehicle hitch device comprising, a draft body having a hollow therein and a notch through said draft body into an opening into said hollow to enable the ball of a stemmed ball member to be inserted into said hollow through said opening and the stem of said stemmed ball member to be inserted into said notch; and means for resiliently pressing and releasably engaging said ball of said stemmed ball member, said means including, presser and biasing means comprising, rectilinearly movable presser means in said hollow and having socket means for said ball of said stemmed ball member to be received in said socket means of said presser means in conformity with said socket means, and means for biasing said presser means to contact said ball of said stemmed ball member received in said socket means of said presser means when said ball projects outwardly from said hollow through said opening and said stemmed ball member is unhitched and is to be hitchingly engaged, and draft thrust transmission means pivotally connected with said draft body to be arcuately moved directly to and from a hitching position and having contact structure to encounter said ball of said stemmed ball member with said ball projecting outside said opening from said hollow during pivotal movement of said draft thrust transmission means toward said hitching position under conditions of said ball of said stemmed ball member being received into said socket means of said presser means with said presser means being progressively thrust inwardly into said hollow by said ball against bias of said biasing means thereby allowing said draft thrust transmission means pivotally to reach said hitching position while said stem of said stemmed ball member is in said notch, and said draft thrust transmission means having socket means for said ball of said stemmed ball member to be received in said socket means of said draft thrust transmission means in conformity with said socket means of said draft thrust transmission means by outward movement of said stemmed ball member with said ball pressed received in said socket means of said presser means under bias of said biasing means when said contact structure of said draft thrust transmission means is outside said opening and said draft thrust transmission means is in said hitching position, and for said ball of said stemmed ball member to be retracted from said socket means in said contact structure of said draft thrust transmission means by inward movement of said stemmed ball member and said presser means against bias of said biasing means, thus enabling pivotal movement of said draft thrust transmission means away from said opening to an unhitching position relative to said stemmed ball member.

8. A vehicle hitch device as set forth in claim 7 wherein said contact structure of said draft thrust transmission means has a bevel surface inclined outwardly, from a recess formed by said socket means of said draft thrust transmission means, to an outer end of said bevel surface leading in said pivotal movement of said draft thrust transmission means toward said hitching position, for actual contact made by said outwardly inclined bevel surface with said ball of said stemmed ball member to progress inwardly toward said hollow, as said actual contact approaches said recess formed by said socket means of said draft thrust transmission means, during continued pivotal movement of said draft thrust transmission means toward said hitching position and while said ball of said stemmed ball member is received in said socket means of said presser means and progresses into said hollow against bias of said biasing means upon said presser means.

9. A vehicle hitch device as set forth in claim 7 wherein engagable means of said draft body and engagable means of said draft thrust transmission means have apertures therein, for said engagable means to receive fastener means for securing said draft thrust transmission means to said draft body through said apertures upon said apertures being aligned to receive said fastener means concurrently with having said ball of said stemmed ball member seated both in said socket means of said draft thrust transmission means and in said socket means of said presser means.

* * * * *